(12) United States Patent
Grisenthwaite

(10) Patent No.: US 8,788,775 B2
(45) Date of Patent: Jul. 22, 2014

(54) MEMORY ACCESS CONTROL USING REDUNDANT AND NON-REDUNDANT ENCODING

(75) Inventor: Richard Roy Grisenthwaite, Royston (GB)

(73) Assignee: Arm Limited, Cambridge (GB)

( * ) Notice: Subject to any disclaimer, the term of this patent is extended or adjusted under 35 U.S.C. 154(b) by 357 days.

(21) Appl. No.: 13/067,812

(22) Filed: Jun. 28, 2011

(65) Prior Publication Data

US 2012/0042144 A1 Feb. 16, 2012

(30) Foreign Application Priority Data

Aug. 11, 2010 (GB) .................................... 1013466.6

(51) Int. Cl.
*G06F 12/00* (2006.01)
(52) U.S. Cl.
USPC ............. 711/163; 711/E12.097; 711/E12.099
(58) Field of Classification Search
None
See application file for complete search history.

(56) References Cited

U.S. PATENT DOCUMENTS

| 4,890,223 | A | 12/1989 | Cruess et al. | |
|---|---|---|---|---|
| 6,349,355 | B1 | 2/2002 | Draves et al. | |
| 7,278,030 | B1* | 10/2007 | Chen et al. | 713/189 |
| 2002/0083251 | A1* | 6/2002 | Chauvel et al. | 710/240 |
| 2002/0194389 | A1* | 12/2002 | Worley et al. | 709/310 |
| 2004/0243823 | A1* | 12/2004 | Moyer et al. | 713/200 |
| 2004/0268089 | A1 | 12/2004 | Shelor | |
| 2006/0026385 | A1* | 2/2006 | Dinechin et al. | 711/210 |
| 2006/0218425 | A1* | 9/2006 | Ding et al. | 713/323 |

FOREIGN PATENT DOCUMENTS

| EP | 0 285 309 | 10/1988 |
|---|---|---|
| EP | 0 319 134 | 6/1989 |
| GB | 2 239 333 | 6/1991 |
| GB | 2448151 A | 10/2008 |
| JP | H01-092856 | 12/1989 |
| JP | 2001-202287 | 1/2007 |
| JP | 2008-257734 | 8/2010 |

OTHER PUBLICATIONS

Great Britain Search Report for GB1013466.6 dated Nov. 9, 2010.
International Search Report and Written Opinion of the International Searching Authority mailed Aug. 16, 2011 in PCT/GB2011/051089.
IBM "PowerPC Embedded Processors Application Note" Oct. 2001, pp. 1-11.
English Translation of Japanese Official Action mailed Apr. 21, 2014 in Japanese Application No. 2013-523661.

* cited by examiner

*Primary Examiner* — Reginald Bragdon
*Assistant Examiner* — Brendan Lillis
(74) *Attorney, Agent, or Firm* — Nixon & Vanderhye P.C.

(57) ABSTRACT

A data processing system 2 including processing circuitry 4 operating in either a first mode or a second mode. Page table data 30 including access control bits 40, 42, is used to control permissions for memory access to memory pages. In the first mode, the access control bits include at least one instance of a redundant encoding. In the second mode, the redundant encoding is removed to provide more efficient use of the access control bit encoding space.

24 Claims, 4 Drawing Sheets

|  |  | 1st access control bit | 2nd access control bit | 2nd ISA — EL1 using AArch64 behaviour | | 1st ISA — EL1 using AArch32 behaviour | | |
|---|---|---|---|---|---|---|---|---|
| AP[2] | AP[1] | UXN/XN | PXN | EL1 (privileged) | EL0 (user) | EL1 (privileged) | EL0 (user) | |
| 0 | 0 | 0 | 0 | RW(X) | X* | RW(X) | None | |
| 0 | 0 | 0 | 1 | RW | X* | RW | None | |
| 0 | 0 | 1 | 0 | RW(X) | None | RW | None | } redundant encoding |
| 0 | 0 | 1 | 1 | RW# | None# | RW# | None# | |
| 0 | 1 | 0 | 0 | RW(X) | RW(X) | RW(X) | RW(X) | |
| 0 | 1 | 0 | 1 | RW | RW(X) | RW | RW(X) | |
| 0 | 1 | 1 | 0 | RW(X) | RW | RW | RW | } redundant encoding |
| 0 | 1 | 1 | 1 | RW# | RW# | RW# | RW# | |
| 1 | 0 | 0 | 0 | RX | X* | RX | None | |
| 1 | 0 | 0 | 1 | R | X* | R | None | |
| 1 | 0 | 1 | 0 | RX | None | R | None | } redundant encoding |
| 1 | 0 | 1 | 1 | R# | None# | R# | None# | |
| 1 | 1 | 0 | 0 | RX | RX | RX | RX | |
| 1 | 1 | 0 | 1 | R | RX | R | RX | |
| 1 | 1 | 1 | 0 | RX | R | R | R | } redundant encoding |
| 1 | 1 | 1 | 1 | R# | R# | R# | R# | |

R = Read permission granted,
W = Write permission granted
X = Execute permission granted \# = same set of access permission in first and second mode
\* = executable but not readable XN = execute never in first mode
UXN = user execute never in second mode
(X) = execute permission gated by override parameter

FIG. 2

MEMORY ACCESS CONTROL USING REDUNDANT AND NON-REDUNDANT ENCODING

BACKGROUND OF THE INVENTION

1. Field of the Invention

This invention relates to the field of data processing systems. More particularly, this invention relates to the field of the control of access permissions to memory pages within the memory address space of a data processing system.

2. Description of the Prior Art

It is known to provide data processing systems with memory management units responsive to page table data to control the access permissions to pages (continuous regions) of memory. As an example, a particular memory page may be marked as accessible for reads and writes in a privileged exception level, but marked for only read access in a user exception level. Further access permissions which may be specified in addition to read and write access are the ability to execute program instructions read from a memory page.

It is known from the PowerPC processor architecture to provide page table data including access control bits which independently and orthogonally specify for each of a privileged level and a user level whether read access, write access and execute access is permitted to a given memory page. This consumes six access control bits per memory page.

As the amount of memory being used within data processing systems is becoming larger and with the advent of techniques such as virtualisation requiring multiple sets of page table data, the size of page table data has become a more significant factor. Reducing the amount of memory space needed to store the page table data by reducing the number of access control bits used is advantageous. Another factor in this regard is the desire to support different modes of operation using different instruction sets. In order to reduce the amount of memory space consumed by page table data, it is desirable that the page table data used by a newly introduced mode, such as a mode using a newly introduced instruction set, should be backward compatible with preceding page table data and a preceding instruction set.

SUMMARY OF THE INVENTION

Viewed from one aspect the present invention provides apparatus for processing data comprising:

processing circuitry responsive to program instructions to perform data processing operations and configured to operate in a plurality of modes; and memory management circuitry coupled to said processing circuitry and to a memory and configured to control access permissions to data values stored within said memory in dependence upon page table data; wherein said memory has a memory address space divided in to a plurality of memory pages and said page table data comprises a plurality of access control bits for each of said plurality of memory pages defining access permissions for a respective memory page;

when said processing circuitry is in a first of said plurality of modes using a predetermined number of access control bits to encode access permissions, said memory management circuitry is responsive to at least one instance of a redundant encoding in which a plurality of different combinations of said access control bits provides a same set of access permissions; and when said processing circuitry is in a second of said plurality of modes using said predetermined number of access control bits to encode access permissions, said memory management unit is responsive said plurality of different combinations of access control bits to provide a plurality of different sets of access permissions in a non-redundant encoding.

The present technique recognises that the access control bits as used in a first mode of operation include one or more instances of a redundant encoding. In a second mode of operation the different combinations of access control bits corresponding to this redundant encoding can be used to provide a plurality of different sets of access permissions thereby making more efficient use of the access control bits encoding space. The first and second mode use the same number of access control bits to encode access permissions. The present technique recognises that in practice, providing, for example, fully orthogonal and independent control of read access, write access and execute access in both user exception level and privileged exception level yields a number of possibilities for access permissions which are not in reality required, e.g. a memory page which was writeable at a user exception level but not writeable at a privileged exception level. The present technique goes further by recognising that redundant encodings within a first mode of operation may be used in a second mode of operation to provide different access permissions and make more efficient use of the access control bits.

As a way of providing advantageous backward compatibility, the plurality of different sets of access permissions provided in the second mode of operation may include the same set of access permissions which correspond to the redundant encoding in the first mode thereby allowing the same page table data to be used in the first mode of operation and the second mode of operation.

In the first mode of operation, the conventional view of access permissions results in the provision of control such that the access permissions must specify that data values stored within a memory page are readable in order for those data values to be executable. However, with the advent of a more widespread use of virtualisation techniques it can be useful in the second mode of operation that a memory page may be executable whilst not being readable as data. As an example, such an arrangement may be useful when program instructions are being translated within a virtualised system so that any attempt to read the non-translated instructions as data may be trapped and appropriate action taken to mask the virtualisation.

Within each of the different modes of operations, there may also be provided a plurality of exception levels including a user level and a privileged level with the privileged level providing greater access to resources of the apparatus (e.g. the privileged level may allow certain controls or configurations to be changed).

While it will be appreciated that the access control bits can be used to provide a plurality of different meanings and encode those meanings in different ways, in some embodiments a first of the access control bit controls the memory management circuitry selectively to prevent execution of the instructions from the corresponding memory page when the processing circuitry is at both the user level and at the privileged level when the processing circuitry is in the first of the plurality of modes. Accordingly, this first access control bit effectively serves as an "execute never" flag when operating in the first mode.

This same first access control bit can be used with a different meaning within the second mode of operation namely to control the memory management circuitry selectively to prevent execution of instructions from a corresponding memory page when the processing circuitry is at the user level but not to control whether or not the processing circuitry can execute instructions from that memory page when it is at the privilege level. Accordingly, in this situation the same first access control bit when operating in the second mode serves as a "user execute never" bit.

A second of the access control bits may be used to control the memory management circuitry selectively to prevent execution of instructions from a corresponding memory page when the processing circuitry is at the privilege level and the processing circuitry is in either the first mode of operation or the second mode of operation. This second of the access control bits thus serves as a "privilege execute never" bit.

It is surprisingly useful in some embodiments that for at least some combinations of the access control bits for a memory page when the processing circuitry is operating at the user level, the memory management circuitry permits execution of instructions from that memory page but does not permit read access or write access to the memory page.

In order to enhance security in a reliable way that is prone to errors in programming, the memory management circuitry may be responsive to an execute control overwrite parameter which prevents execution of instructions read from a memory page irrespective of any execute permission specified by the access control bits for that memory page when the access control bits for that memory page provide write access to that memory page. The provision of both write access and execution access at the same time is a potential security vulnerability and accordingly preventing execution of memory pages which could be subject to alteration is a security enhancement. The execute control override parameter permits such control to be provided in a simple manner and independently of the page table data itself (which may be large, complex and changing).

The different modes of operation could take a variety of different forms, but in at least some embodiments the first mode of operation corresponds to the processing circuitry being responsive to program instructions from a first instruction set and the second mode of operation corresponds to the processing circuitry being responsive to program instructions from a second instruction set.

Viewed from a further aspect the present invention provides apparatus for processing data comprising:

processing means for performing data processing operations in response to program instructions, said processing means being configured to operate in a plurality of modes; and memory management means coupled to said processing means and to a memory for controlling access permissions to data values stored within said memory in dependence upon page table data; wherein said memory has a memory address space divided in to a plurality of memory pages and said page table data comprises a plurality of access control bits for each of said plurality of memory pages defining access permissions for a respective memory page;

when said processing means is in a first of said plurality of modes using a predetermined number of access control bits to encode access permissions, said memory management means is responsive to at least one instance of a redundant encoding in which a plurality of different combinations of said access control bits provides a same set of access permissions; and when said processing means is in a second of said plurality of modes using said predetermined number of access control bits to encode access permissions, said memory management means is responsive said plurality of different combinations of access control bits to provide a plurality of different sets of access permissions in a non-redundant encoding.

Viewed from a further aspect the present invention provides a method of processing data comprising the steps of:

performing data processing operations with processing circuitry in response to program instructions, said processing circuitry being configured to operate in a plurality of modes; and controlling access permissions to data values stored within said memory in dependence upon page table data; wherein said memory has a memory address space divided in to a plurality of memory pages and said page table data comprises a plurality of access control bits for each of said plurality of memory pages defining access permissions for a respective memory page;

when said processing circuitry is in a first of said plurality of modes using a predetermined number of access control bits to encode access permissions, said access control bits provide to at least one instance of a redundant encoding in which a plurality of different combinations of said access control bits provides a same set of access permissions; and when said processing circuitry is in a second of said plurality of modes, using said predetermined number of access control bits to encode access permissions said plurality of different combinations of access control bits provide a plurality of different sets of access permissions in a non-redundant encoding.

Embodiments of the invention may also be provided in the form of a virtual machine comprising a general purpose computer controlled by a computer program to provide an execution environment for performing the above described techniques.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is a table illustrating the mapping between access control bits of page table data and the access permissions provided in a first mode of operation and in a second mode of operation;

DESCRIPTION OF THE EMBODIMENTS

Figure 1:
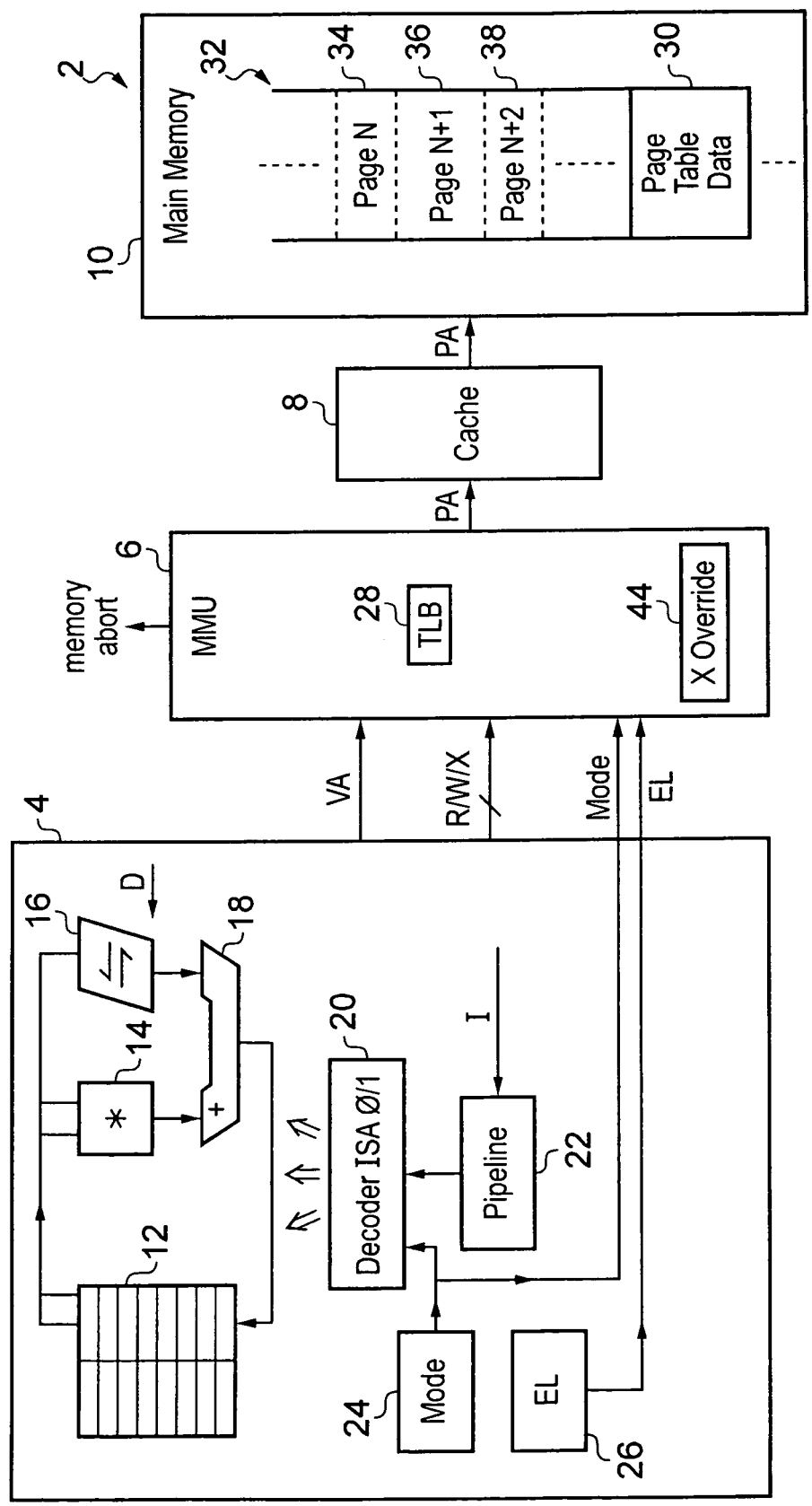
FIG. 1 schematically illustrates a data processing system including a memory management unit responsive to page table data for controlling memory accesses.

FIG. 1 schematically illustrates a data processing system 2 including processing circuitry 4 in the form of processor core, coupled via a memory management unit 6 and a cache memory 8 to a main memory 10. The processing circuitry 4 includes a data path comprising a general purpose register bank 12, a multiplier 14, a shifter 16 and an adder 18 controlled by control signals generated by an instruction decoder 20 in response to program instructions passed along an instruction pipeline 22. The instruction decoder 20 is able to decode instructions from both a first instruction set and a second instruction set. A mode register 24 stores a mode value controlling the instruction decoder 20 to decode the program instructions from the instruction pipeline 22 as either instructions from the first instruction set (ISA0) or as instructions from the second instruction set (ISA1).

The processing circuitry 4 as well as operating in the two different modes described above corresponding to the use of two different instruction sets, is also able to operate within each of these modes at a plurality of different exception levels, namely a user level and a privilege level. An exception level register 26 stores data defining the current exception level of the processing circuitry 4. In dependence upon the current exception level as indicated in the exception level register 26, the processing circuitry 4 is able to access different resources within the data processing system 2. As will be familiar to those in this technical field, at a privileged level more access to resources is normally given than at a user level. For example, some configuration parameters or instructions may only be available for charging or execution at the privileged level and may not be available at the user level.

The processing circuitry 4 when generating memory accesses produces a virtual address VA which is translated to a physical address PA by the memory management unit 6. The memory management unit 6 is also responsible for managing the access permissions associated with memory pages into which the memory address space of the main memory 10 is divided. A translation lookaside buffer 28 within the memory management unit 6 performs the majority of virtual to physical address translations using a cached copy of the page table data 30 stored within the main memory 10. This page table data as well as specifying the virtual to physical address translation also specifies access permissions using access control bits.

When a memory access is received by the memory management unit 6 from the processing circuitry 4, the current mode and current exception level are checked against the access permissions to determine whether or not the memory access is authorised. Whether or not the memory access is authorised will also depend upon whether the memory access is a read memory access, a write memory access or an access seeking to fetch an instruction for execution from the memory page concerned.

The translated physical address PA output from the memory management unit 6 for a permitted memory access is passed to the cache memory 8. If the cache memory 8 is storing the data concerned, then that memory access is serviced by the cache memory 8. If the cache memory 8 is not storing the data concerned, then the memory access progresses to the main memory 10.

As illustrated in FIG. 1, the main memory includes a memory address space 32 divided into a plurality of memory pages 34, 36, 38 which can have different sizes and have different access permissions associated therewith. Also included within the memory address space 32 is the page table data 30 which stores the data defining the virtual to physical address mappings as well as the access control bits for controlling access permissions depending upon the mode of operation of the processing circuitry and the exception level of the processing circuitry 4.

FIG. 2 is a table illustrating the relationship between the access control bits stored within the page table data 30 for a given memory page and the access permissions provided by those access control bits in the first mode of operation in and the second mode of operation as well as the different exception levels within those modes of operation. As will be seen, there are four access control bits in this example embodiment.

A first access control bit 40 corresponds to an execute never control bit applicable in both the user level and the privileged level when the processing circuitry 4 is in the first mode executing the first instruction set. In the second mode when the processing circuitry 4 is executing the second instruction set, the first access control bit 40 serves as a user execute never control bit specifying whether or not execution is permitted for that memory page at the user level and having no control over whether or not execution is permitted from that memory page when at the privileged level.

A second access control bit 42 serves as a privilege execute never control bit. In the second mode of operation, the second access control bit 42 being the privilege execute never control bit and the first access control bit 40 being the user execute never control bit operate independently and orthogonally. In the first mode of operation the first access control bit 40 acting as an execute never control bit is able to override the indication of the second access control bit 42 serving as the privilege execute never control bit. Thus, if the first access control bit 40 indicates that a memory page is a never execute memory page, then execute permission will not be permitted within that memory page even if the privilege execute never control bit 42 indicates that privilege level execution is permitted.

This behaviour of the first access control bit 40 overriding the indication of the second access control bit 42 when in the first mode of operation leads to redundant encodings within the first mode of operation as marked in FIG. 2. Thus, different combinations of access control bits lead to the same access permissions within the first mode of operation corresponding to a waste of encoding bit space of the access control bits.

In the second mode of operation, the access control bits are decoded different and this redundancy is removed to provide a non-redundant encoding in which the access permissions given by the different combinations of access control bits correspond to different combinations of access permissions. One of the combinations of access permissions given in the second mode is the same as the single combination of access permissions which is given in the first mode, thereby assisting backward compatibility. This same set of access permissions is marked with the "#" in FIG. 2.

Within the first mode of operation of the processing circuitry 4 a memory page must be readable in order to be executable. This condition is not applied in the second mode of operation of the processing circuitry 4. The access permissions being execute only access permissions marked with a "*" in FIG. 2 correspond to a form of access permission which is not provided by the encoding within the first mode of operation.

As illustrated in FIG. 2, the upper half of the encoding of the access control bits provides write access for at least some combinations of the access control bits whereas in the bottom half of the table, no write access is permitted. The execute permissions provided when write access is available my be overridden by an execute control override parameter stored within a control register 44 of the memory management unit 6 as illustrated in FIG. 1. This execute control override parameter may be written under privileged level software control or may be set under hardware control if even greater security is desired. When the execute control override parameter is set, execute permission for a memory page that is writeable will not be permitted even if the first access control bit 40 and/or the second access control bit 42 indicate that execute permission is allowed.

Figure 3:
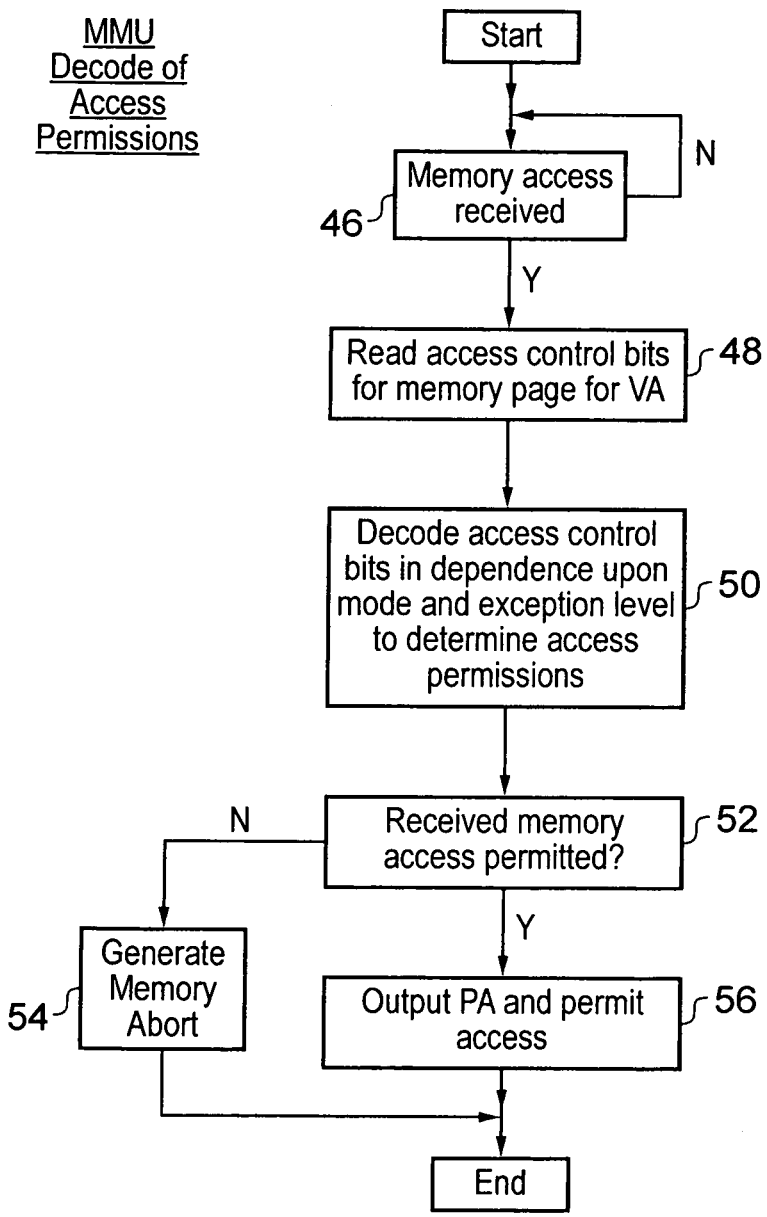
FIG. 3 is a flow diagram schematically illustrating the action of the memory management unit decoding access permissions.

FIG. 3 is a flow diagram illustrating the action of the memory management unit 6 in decoding the access permissions when a memory access is received. At step 46 the memory management unit 6 waits for a memory access to be received. At step 48 the access control bits for the memory page corresponding to that virtual address of the memory access are read. Such a read of the access control bits may be performed by a lookup in the translation lookaside buffer 28 if the memory page concerned has been recently accessed or may alternatively require a page table walk through the page table data 30 as will be familiar to those in this technical field.

At step 50 the access control bits are decoded in dependence upon the current mode of the processing circuitry (e.g. whether the processing circuitry is executing instructions of the first instruction set or instructions of the second instruction set) as well as the current exception level (e.g. whether the processing circuitry is at the user level or the privilege level) to determine the access permissions to be granted. This decoding is in accordance with the table of FIG. 2.

At step 52 the decoded access permissions are compared with the memory access being attempted and a determination is made as to whether or not the memory access being attempted is a permitted memory access. If the memory access is not permitted, then step 54 generates a memory abort. If the memory access is permitted, then step 56 outputs the physical address corresponding to the received virtual address and the memory access is permitted to pass to the cache memory 8 or the main memory 10 as appropriate.

Figure 4:
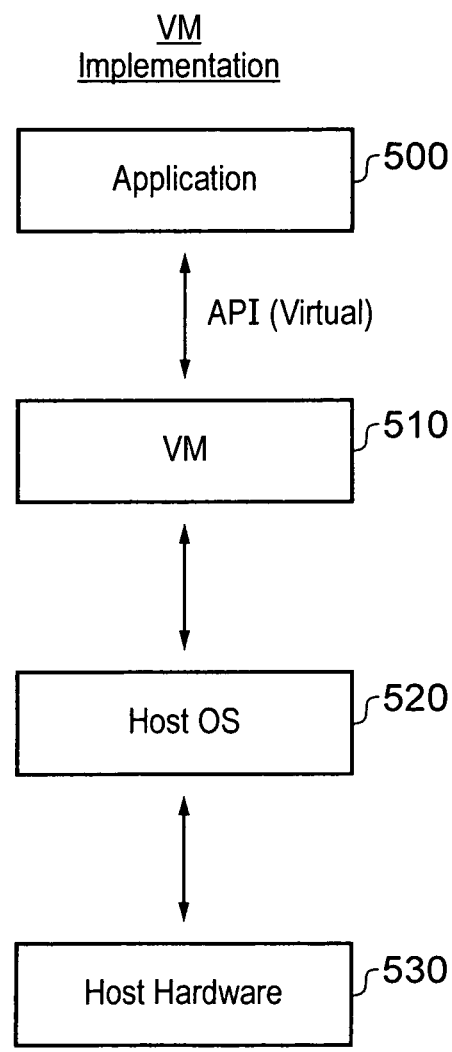
FIG. 4 is a diagram schematically illustrating a virtual machine environment for implementing the above described techniques.

FIG. 4 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
    processing circuitry responsive to program instructions to perform data processing operations and configured to operate in a plurality of modes; and
    memory management circuitry coupled to said processing circuitry and to a memory and configured to control access permissions to data values stored within said memory in dependence upon page table data; wherein
    said memory has a memory address space divided in to a plurality of memory pages and said page table data comprises a plurality of access control bits for each of said plurality of memory pages defining access permissions for a respective memory page;
    when said processing circuitry is in a first of said plurality of modes using a predetermined number of access control bits to encode access permissions, said memory management circuitry is responsive to at least one instance of a redundant encoding in which a plurality of different combinations of said access control bits provides a same set of access permissions; and
    when said processing circuitry is in a second of said plurality of modes using said predetermined number of access control bits to encode access permissions, said memory management circuitry is responsive to said plurality of different combinations of access control bits to provide a plurality of different sets of access permissions in a non-redundant encoding.

2. Apparatus as claimed in claim 1, wherein said plurality of different sets of access permissions include said same set of access permissions providing a set of access control bit values that are compatible between operation in said first of said plurality of modes and said second of said plurality of modes.

3. Apparatus as claimed in claim 1, wherein in said first of said modes said access permissions must specify that data values stored within a memory page are readable in order for said data values within said memory page to be executable.

4. Apparatus as claimed in claim 3, wherein in said second of said modes said access permissions need not specify that data values stored within a memory page are readable in order for said data values within said memory page to be executable, such that said data values may not be read as data, but said data values may be executed as instructions.

5. Apparatus as claimed in claim 1, wherein said processing circuitry is configured to operate at a plurality of exception levels within each of said plurality of modes, said plurality of exception levels including a user level and a privileged level, said privileged level providing greater access to resources of said apparatus.

6. Apparatus as claimed in claim 5, wherein a first of said access control bits controls said memory management circuitry selectively to prevent execution of instructions from a corresponding memory page when said processing circuitry is at both said user level and at said privileged level when said processing circuitry is in said first of said plurality of modes.

7. Apparatus as claimed in claim 6, said first of said access control bits controls said memory management circuitry selectively to prevent execution of instructions from a corresponding memory page when said processing circuitry is at said user level but not at said privileged level when said processing circuitry is in said second of said plurality of modes.

8. Apparatus as claimed in claim 6, wherein a second of said access control bits controls said memory management circuitry selectively to prevent execution of instructions from a corresponding memory page when said processing circuitry is at said privileged level when said processing circuitry is in both said first of said plurality of modes and said second of said plurality of modes.

9. Apparatus as claimed in claim 4, wherein for at least some combinations of said access control bits for a memory page when said processing circuitry is operating at said user level, said memory management circuitry permits execution of instructions from said memory page but does not permit read access and write access to said memory page.

10. Apparatus as claimed in claim 1, wherein when said access control bits provide write access to a memory page, said memory management circuitry is responsive to an execute control override parameter to prevent execution of instructions read from said memory page irrespective of any execute permission specified by said access control bits.

11. Apparatus as claimed in claim 1, wherein when operating in said first of said plurality of modes said processing circuitry is responsive to program instructions from a first instruction set and when operating in said second of said plurality of modes said processing circuitry is responsive to program instructions from a second instruction set.

12. Apparatus for processing data comprising:
processing means for performing data processing operations in response to program instructions, said processing means being configured to operate in a plurality of modes; and
memory management means coupled to said processing means and to a memory for controlling access permissions to data values stored within said memory in dependence upon page table data; wherein
said memory has a memory address space divided in to a plurality of memory pages and said page table data comprises a plurality of access control bits for each of said plurality of memory pages defining access permissions for a respective memory page;
when said processing means is in a first of said plurality of modes using a predetermined number of access control bits to encode access permissions, said memory management means is responsive to at least one instance of a redundant encoding in which a plurality of different combinations of said access control bits provides a same set of access permissions; and
when said processing means is in a second of said plurality of modes using said predetermined number of access control bits to encode access permissions, said memory management means is responsive said plurality of different combinations of access control bits to provide a plurality of different sets of access permissions in a non-redundant encoding.

13. A method of processing data comprising the steps of:
performing data processing operations with processing circuitry in response to program instructions, said processing circuitry being configured to operate in a plurality of modes; and
controlling access permissions to data values stored within said memory in dependence upon page table data; wherein
said memory has a memory address space divided in to a plurality of memory pages and said page table data comprises a plurality of access control bits for each of said plurality of memory pages defining access permissions for a respective memory page;
when said processing circuitry is in a first of said plurality of modes using a predetermined number of access control bits to encode access permissions, said access control bits provide to at least one instance of a redundant encoding in which a plurality of different combinations of said access control bits provides a same set of access permissions; and
when said processing circuitry is in a second of said plurality of modes using said predetermined number of access control bits to encode access permissions, said plurality of different combinations of access control bits provide a plurality of different sets of access permissions in a non-redundant encoding.

14. A method as claimed in claim 13, wherein said plurality of different sets of access permissions include said same set of access permissions providing a set of access control bit values that are compatible between operation in said first of said plurality of modes and said second of said plurality of modes.

15. A method as claimed in claim 13, wherein in said first of said modes said access permissions must specify that data values stored within a memory page are readable in order for said data values within said memory page to be executable.

16. A method as claimed in claim 15, wherein in said second of said modes said access permissions need not specify that data values stored within a memory page are readable in order for said data values within said memory page to be executable, such that said data values may not be read as data, but said data values may be executed as instructions.

17. A method as claimed in claim 13, wherein said processing circuitry is configured to operate at a plurality of exception levels within each of said plurality of modes, said plurality of exception levels including a user level and a privileged level, said privileged level providing greater access to resources of an apparatus performing said method.

18. A method as claimed in claim 17, wherein a first of said access control bits controls selective prevention of execution of instructions from a corresponding memory page when said processing circuitry is at both said user level and at said privileged level when said processing circuitry is in said first of said plurality of modes.

19. A method as claimed in claim 18, said first of said access control bits controls selective prevention of execution of instructions from a corresponding memory page when said processing circuitry is at said user level but not at said privileged level when said processing circuitry is in said second of said plurality of modes.

20. A method as claimed in claim 18, wherein a second of said access control bits controls said memory management circuitry selectively to prevent execution of instructions from a corresponding memory page when said processing circuitry is at said privileged level when said processing circuitry is in both said first of said plurality of modes and said second of said plurality of modes.

21. A method as claimed in claim 16, wherein for at least some combinations of said access control bits for a memory page when said processing circuitry is operating at said user level, execution of instructions from said memory page is permitted but read access and write access to said memory page is not permitted.

22. A method as claimed in claim 13, wherein when said access control bits provide write access to a memory page, an execute control override parameter serves to control prevention of execution of instructions read from said memory page irrespective of any execute permission specified by said access control bits.

23. A method as claimed in claim 13, wherein when operating in said first of said plurality of modes said processing circuitry is responsive to program instructions from a first instruction set and when operating in said second of said plurality of modes said processing circuitry is responsive to program instructions from a second instruction set.

24. A non-transitory, computer-readable medium comprising a virtual machine, said virtual machine comprising a computer program controlling a computer to perform a method as claimed in claim 13.

* * * * *